UNITED STATES PATENT OFFICE.

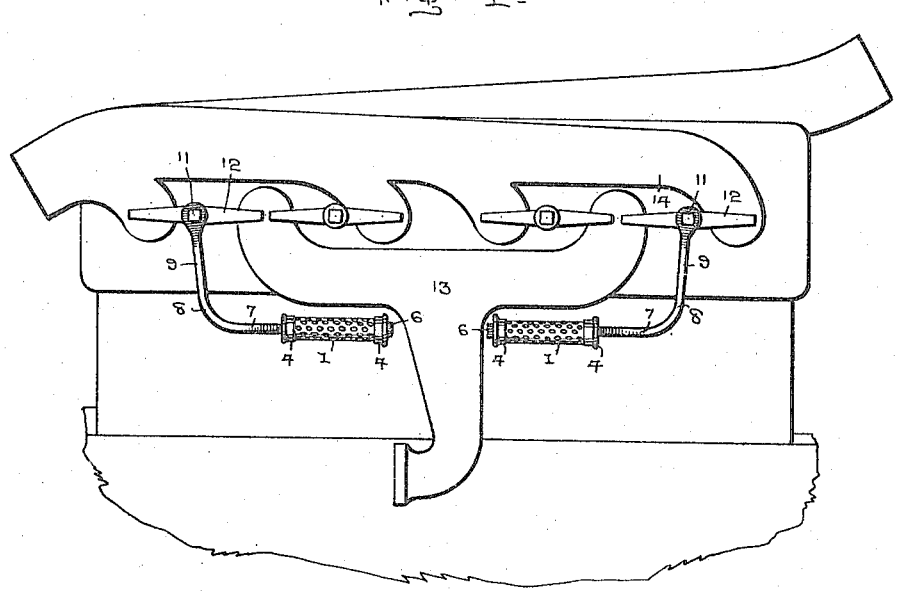
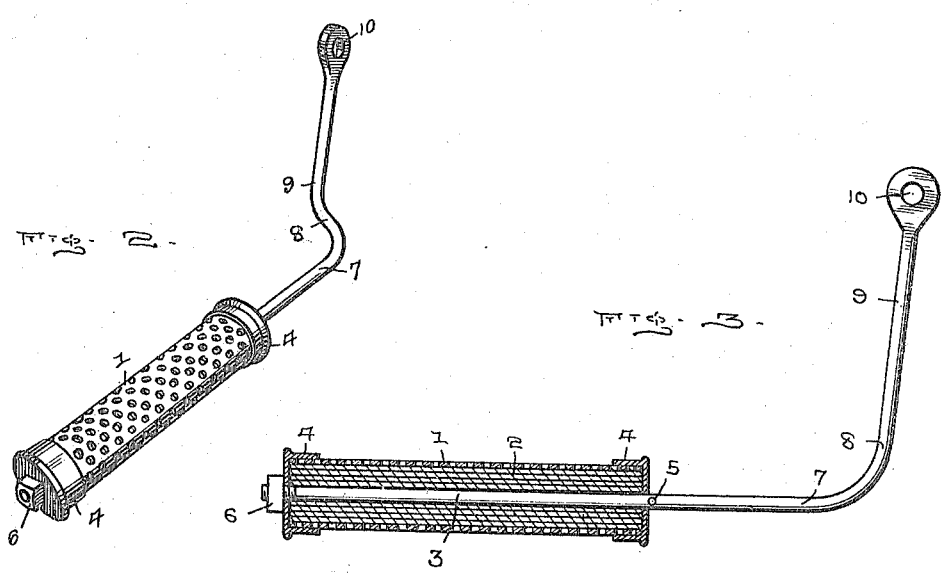

JAMES M. WORKMAN AND THOMAS B. HUFFMAN, OF IONIA, KANSAS.

HEAT-GENERATING MEDIUM.

1,257,570.     Specification of Letters Patent.      Patented Feb. 26, 1918.

Application filed December 30, 1916. Serial No. 139,901.

*To all whom it may concern:*

Be it known that we, JAMES M. WORKMAN and THOMAS B. HUFFMAN, citizens of the United States, residing at Ionia, in the county of Jewell and State of Kansas, have invented certain new and useful Improvements in Heat-Generating Mediums; and we do hereby declare the following to be a full, clear, and exact description of the invention, such as will enable others skilled in the art to which it appertains to make and use the same.

This invention relates to vaporizing devices, and more particularly to a heat generating medium.

The principal object of the invention is to provide a heat radiating medium supported from an internal combustion engine and positioned beneath the intake manifold thereof so as to produce a sufficient amount of heat to vaporize the hyprocarbon within the intake manifold in the initial starting of the engine.

Another object of the invention is to provide a heat radiating medium adapted to be suspended beneath the intake manifold of the engine so as to readily and quickly vaporize the hydrocarbon in its passage through the intake manifold to facilitate an easy and ready starting of the engine in cold weather.

Another object of the invention is to provide a pair of porous cylindrical members adapted to be supported beneath the opposite ends of the intake manifold so that the members may be saturated with an inflammable fluid and subsequently ignited to provide a torch or heat radiating medium sufficient to heat the intake manifold enough to vaporize the hydrocarbon in its passage therethrough.

A still further object of the invention is to provide heat radiating mediums and means for supporting the heat radiating mediums from the engine beneath the opposite ends of the intake manifold and adjacent the vertically disposed intake portion of the intake manifold.

With these and other objects in view as will appear as the description proceeds, the invention comprises the various novel features of construction, combination and arrangement of parts as will be more fully described hereinafter, and afterward specifically claimed.

Referring to the drawings,

Figure 1 is a side elevation of a gasolene motor showing our improved heat generating mediums arranged in position beneath the opposite ends of the intake manifold.

Fig. 2 is a detail perspective view of one of the heat radiating mediums or generators, and Fig. 3 is a vertical longitudinal sectional view through the device.

Similar characters of reference are used to denote like parts throughout the accompanying drawings.

Referring to the drawings, 1 indicates a porous or perforated cylindrical tube, within which is arranged an asbestos filler 2, which consists of a sheet of asbestos paper coiled around the outer end of the horizontally disposed supporting arm 3, which extends centrally and longitudinally through the perforated tubular casing 1.

This asbestos filler is held within the perforated casing by end caps 4 which are frictionally engaged over the opposite ends of the perforated casing.

The heat radiating device or generator proper is supported upon the horizontally disposed end 3 of the supporting arm and is held against lateral movement in one direction upon the arm by a pin 5 which is passed transversely through the arm 3 so as to bear against the outer surface of the inner cap 4. The device is held upon the arm and against this pin 5 by a retaining nut 6 which is mounted upon the outer free end of the supporting arm 3 and bears against the outer surface of the outer cap 4. By this means the cylindrical generator may be readily and quickly removed from the supporting arm and replaced with another one or with a new filler should the one in use become worn or unfit for use.

The supporting arm 3 extends from the device as indicated by the numeral 7 and is then bent and offset laterally as at 8, the arm being continued from this offset portion 8 in vertical and angular relation to the extension 7 and the arm 3 as indicated at 9.

The upper end of this vertical and angularly disposed portion 9 is flattened and provided with an aperture 10 which may be passed over one of the studs 11 carried by the motor which is designed to hold the clamping member 12 over the adjacent ends of the intake and exhaust manifolds 13 and 14 respectively.

When each of the heat generating mediums or generators has been supported from the studs 11, it will be apparent that each of the devices proper will be supported directly beneath the opposite ends of the intake manifold and adjacent the under surface thereof, by reason of the fact that the generating supporting arm is offset laterally and inwardly toward the engine.

The devices having been arranged in position, and as it is desired to start the motor, say for instance in very cold weather, each of the devices is saturated with gasolene, alcohol, or some other inflammable liquid and then ignited, whereupon a sufficient flame will be produced to effectively heat the offset ends of the intake manifold to completely and thoroughly vaporize the hydrocarbon in its initial passage therethrough.

From the foregoing description, it will be apparent that the use of devices of this character will facilitate the easy and ready starting of an automobile engine or other form of gasolene motor in the coldest weather.

What we claim is:—

A heating medium comprising a perforated or porous cylinder, caps on the ends of the cylinder having central openings, a central bar passed through the cylinder and the openings in the caps, a noncombustible sheet coiled around the bar within the cylinder, a transverse pin in and projecting laterally from the bar to limit its entrance into the cylinder, and a nut on the outer end of the bar to clamp the cylinder against the transverse pin, the bar, outside of the cylinder being bent laterally and then vertically and provided with an opening in its end for attaching purposes, as and for the purpose set forth.

In testimony whereof we have signed our names to this specification in the presence of two subscribing witnesses.

JAMES M. WORKMAN.
THOMAS B. HUFFMAN.

Witnesses:
WILEY HUFFMAN,
ERNEST E. COLSON.

Copies of this patent may be obtained for five cents each, by addressing the "Commissioner of Patents, Washington, D. C."